US009166230B1

(12) United States Patent
Lahiri et al.

(10) Patent No.: US 9,166,230 B1
(45) Date of Patent: Oct. 20, 2015

(54) THREE-DIMENSIONAL BATTERY HAVING CURRENT-REDUCING DEVICES CORRESPONDING TO ELECTRODES

(75) Inventors: Ashok Lahiri, Cupertino, CA (US); Robert Spotnitz, Pleasanton, CA (US)

(73) Assignee: ENOVIX CORPORATION, Fremont, CA (US)

( * ) Notice: Subject to any disclaimer, the term of this patent is extended or adjusted under 35 U.S.C. 154(b) by 1524 days.

(21) Appl. No.: 12/013,397

(22) Filed: Jan. 11, 2008

Related U.S. Application Data

(60) Provisional application No. 60/884,843, filed on Jan. 12, 2007, provisional application No. 60/884,828, filed on Jan. 12, 2007.

(51) Int. Cl.
*H01M 4/62* (2006.01)
*H01M 4/64* (2006.01)
*H01M 2/34* (2006.01)
*H01M 10/42* (2006.01)

(52) U.S. Cl.
CPC ........ *H01M 4/62* (2013.01); *H01M 4/64* (2013.01); *H01M 2/34* (2013.01); *H01M 10/4235* (2013.01)

(58) Field of Classification Search
CPC ..... H01M 10/4235; H01M 4/62; H01M 4/64; H01M 2/34
USPC ........................................................ 429/152
See application file for complete search history.

(56) References Cited

U.S. PATENT DOCUMENTS

| 4,820,599 A | 4/1989 | Furukawa et al. |
| 4,996,129 A | 2/1991 | Tuck |
| 5,294,504 A | 3/1994 | Otagawa |
| 5,993,990 A | 11/1999 | Kanto et al. |
| 6,432,585 B1 | 8/2002 | Kawakami |
| 6,458,485 B2 * | 10/2002 | Yanai et al. ................... 429/211 |
| 6,498,406 B1 | 12/2002 | Horiuchi |
| 6,821,673 B1 * | 11/2004 | Hamada et al. ............... 429/160 |
| 6,878,173 B2 | 4/2005 | Miyahisa |
| 7,153,609 B2 | 12/2006 | Kubo et al. |

(Continued)

FOREIGN PATENT DOCUMENTS

| CA | 02388711 A1 | 5/2001 |
| JP | 2003-217596 | * 7/2003 |

(Continued)

OTHER PUBLICATIONS

Machine Translation of JP2003-217596.*

(Continued)

*Primary Examiner* — Milton I Cano
*Assistant Examiner* — Stephen Yanchuk
(74) *Attorney, Agent, or Firm* — Bryan Cave LLP

(57) ABSTRACT

Various three-dimensional battery structures are disclosed, in certain embodiments comprising a battery enclosure and a first plurality of electrodes within the enclosure. The first plurality of electrodes includes a plurality of cathodes and a plurality of anodes. The first plurality of electrodes includes a second plurality of electrodes selected from the first plurality of electrodes. The three-dimensional battery includes a first structural layer within the battery enclosure. Each of the second plurality of electrodes protrudes from the first structural layer. The three-dimensional battery includes a plurality of electrical current-reducing devices within the enclosure. Each of the second plurality of electrodes is coupled to one of the plurality of current-reducing devices.

28 Claims, 6 Drawing Sheets

(56) References Cited

U.S. PATENT DOCUMENTS

| | | | |
|---|---|---|---|
| 2002/0034685 | A1 | 3/2002 | Sato et al. |
| 2002/0136957 | A1* | 9/2002 | Zhang et al. ............... 429/246 |
| 2004/0170887 | A1* | 9/2004 | Masumoto et al. ............ 429/61 |
| 2004/0185336 | A1* | 9/2004 | Ito et al. .................... 429/152 |
| 2004/0241540 | A1* | 12/2004 | Tsutsumi et al. ............. 429/122 |
| 2005/0079422 | A1* | 4/2005 | Ko et al. .................. 429/231.95 |
| 2007/0059584 | A1* | 3/2007 | Nakano et al. ............... 429/40 |
| 2007/0172732 | A1 | 7/2007 | Jung et al. |
| 2007/0243460 | A1 | 10/2007 | Carlson et al. |
| 2010/0119939 | A1 | 5/2010 | Misumi et al. |
| 2011/0111283 | A1 | 5/2011 | Rust, III et al. |

FOREIGN PATENT DOCUMENTS

| | | |
|---|---|---|
| JP | 2008153033 A | 7/2008 |
| JP | 2008153034 A | 7/2008 |
| JP | 2008153035 A | 7/2008 |
| JP | 2008153036 A | 7/2008 |
| WO | 2008072638 A1 | 6/2008 |

OTHER PUBLICATIONS

Long et. al., "Three-Dimensional Battery Architectures," Chemical Reviews, (2004), 104, 4463-4492.

Chang Liu, Foundations of MEMS, Chapter 10, pp. 1-55 (2006).

Kanamura et. al., "Electrophoretic Fabrication of LiCoO2 Positive Electrodes for Rechargeable Lithium Batteries," J. Power Sources, 97-98 (2001) 294-297.

Caballero et al., "LiNi0.5Mn1.5O4 thick-film electrodes prepared by electrophoretic deposition for use in high voltage lithium-ion batteries," J. Power Sources, 156 (2006) 583.

Wang and Cao, "Li+-intercalation Electrochemical/chromic Props of Vanadium Pentoxide Films by Sol Electrophoretic Deposition," Electrochimica Acta, 51, (2006), 4865-4872.

Nishizawa et al., "Template Synth of Polypyrrole-Coated Spinel LiMn2O4 Nanotubules and Props as Cathode Active Materials for Li Batteries," J.Electrochem.Soc., 1923-1927(1997).

Shembel et. al., "Thin Layer Electrolytic Molybdenum Oxysulfides for Li Secondary Batteries With Liquid and Polymer Electrolytes," 5th Adv Batteries and Accumulators (2004).

Kobrin et. al., "Molecular Vapor Deposition—An Improved Vapor-Phase Deposition Technique of Molecular Coatings for MEMS Devices," SEMI Tech Symp:(STS,ISM), 2004.

Green et al., "Structured Silicon Anodes for Li Battery Applications," Electrochem & Solid State Letters, 6, 2003 A75-A79.

Shin et al., "Porous Silicon Negative Electrodes for Rechargeable Lithium Batteries," J. Power Sources, 139 (2005) 314-320.

Broussely and Archdale, "Li-ion batteries and portable power source prospects for the next 5-10 years," J. Power Sources, 136, (2004), 386-394.

V. Lehmann, "The Physics of Macropore Formation in Low Doped n-Type Silicon," J. Electrochem. Soc. 140 (1993), 10, 2836-2843.

Vyatkin et al., "Random and Ordered Macropore Formation in p-Type Silicon," J. Electrochem. Soc. 149, 1, G70-G76 (2002).

van den Meerakker et al., "Etching of Deep Macropores in 6 in. Si Wafers," J. Electrochem. Soc. 147, 7, 2757-2761 (2000).

P.G. Balakrishnan, R. Ramesh, and T. Prem Kumar, "Safety mechanisms in lithium-ion batteries," Journal of Power Sources, 2006, 155, 401-414.

P. Arora and Z. Zhang, "Battery separators," Chem. Rev., 2004, 104, 4419-4462.

International Search Authority, PCT International Search Report and Notification of Transmittal, Int'l App. No. PCT/US 08/50942, May 18, 2008.

Chan, High-performance lithium battery anodes using silicon nanowires, Nature Nanotechnology, vol. 3, pp. 31-35, Jan. 2008.

Serpo, A tenfold improvement in battery life?, ZDNet News, Jan. 15, 2008.

* cited by examiner

THREE-DIMENSIONAL BATTERY HAVING CURRENT-REDUCING DEVICES CORRESPONDING TO ELECTRODES

CROSS-REFERENCE TO RELATED APPLICATIONS

This application claims priority under 35 U.S.C. section 119(e) to U.S. Provisional Application No. 60/884,843, entitled "Safety Mechanisms for Three-Dimensional Energy Systems," filed on Jan. 12, 2007, and to U.S. Provisional Application No. 60/884,828, entitled "Three-Dimensional Batteries and Methods of Manufacturing Using Backbone Structure," filed on Jan. 12, 2007, both of which are hereby incorporated by reference herein in their entirety.

FIELD OF THE INVENTION

The present invention relates generally to the field of battery technology, and more particularly to safety mechanisms used in batteries.

BACKGROUND

Energy storage devices such as lithium batteries are the state of the art power sources for many electronic devices due to their high energy density, high power, and long shelf life. However, there is a risk that energy storage devices might release energy accidentally (e.g., through abuse) in an undesirable or uncontrolled manner. Building safety features into batteries can reduce this risk and improve abuse tolerance.

The safety of current lithium-ion batteries may be compromised by various mechanisms, many of which are related through a temperature increase phenomenon. Excessive heat and thermal runaway may occur due to electrolyte decomposition at overcharge and at elevated operating temperatures. Thermal runaway might also occur due to oxygen evolution in case of high voltage cathode materials such as $LiCoO_2$. In some cases, mechanical abuse can also cause active materials to short together, thereby resulting in thermal runaway. This could be caused due to overcharging the batteries, electrical shorts, or mechanical abuse related shorting. A rapid release of heat during chemical reactions pertaining to electrolyte or cathode decomposition can increase the risk of thermal runaway in conventional two-dimensional batteries.

Self-stopping devices, for example polymer or ceramic materials with Positive Temperature Coefficient (PTC) of resistance, have been used to enhance the safety of conventional two-dimensional batteries. Such materials are sometimes referred to as resettable fuses or self-regulating thermostats. For example, reference to P. G. Balakrishnan, R. Ramesh, and T. Prem Kumar, "Safety mechanisms in lithium-ion batteries," *Journal of Power Sources*, 2006, 155, 401-414 may help to illustrate the state of the art in safety mechanisms in conventional lithium-ion batteries, and is therefore incorporated by reference as non-essential subject matter herein.

Heat dissipation in a battery should be sufficient to reduce the risk of thermal runaway. However, traditional two-dimensional batteries may not dissipate sufficient heat because too much of the cross sectional area of the battery is taken up by cathode and anode materials, which typically do not conduct heat very well.

Three-dimensional battery architectures (e.g., interdigitated electrode arrays) have been proposed in the literature to provide higher electrode surface area, higher energy and power density, improved battery capacity, and improved active material utilization compared with two-dimensional architectures (e.g., flat and spiral laminates). For example, reference to Long et. al., "Three-dimensional battery architectures," *Chemical Reviews*, 2004, 104, 4463-4492, may help to illustrate the state of the art in proposed three-dimensional battery architectures, and is therefore incorporated by reference as non-essential subject matter herein. FIG. 1 shows a schematic representation of a cross-section of one example of a three-dimensional battery that has been proposed in the literature. The battery includes a cathode current collector 10 from which cathodes 11 extend in a height direction at various points. A similar structure is made with an anode current collector 14 and anodes 13. The regions between the cathodes 11 and the anodes 13 (and some areas of the current collectors 10 and 14) include electrolyte 12.

The cathodes 11 and anodes 13 may be assembled in various three-dimensional configurations. This can include, for example, inter-digitated pillars or plates where the anodes 13 and the cathodes 11 are in proximity to each other in more than one direction. For example, in FIG. 1, each anode 13 is in close proximity to two cathodes 11, one on either side. In structures such as pillars, each electrode could be in proximity to surfaces from more than two counter electrodes. The anode and cathode current collectors 10 and 14 can be separate (top and bottom connection as shown in FIG. 1) or coplanar.

However, three-dimensional battery architectures can present challenges for achieving adequate safety. Accordingly, improved safety features for three-dimensional batteries are needed in the art.

SUMMARY

Various three-dimensional battery structures are disclosed and claimed. In one such structure, the three-dimensional battery comprises a battery enclosure and a first plurality of electrodes within the enclosure. The first plurality of electrodes includes a plurality of cathodes and a plurality of anodes. The first plurality of electrodes includes a second plurality of electrodes selected from the first plurality of electrodes. The three-dimensional battery includes a first structural layer within the battery enclosure. Each of the second plurality of electrodes protrudes from the first structural layer. The three-dimensional battery includes a plurality of electrical current-reducing devices within the enclosure. Each of the second plurality of electrodes is coupled to one of the plurality of current-reducing devices. Other aspects and advantages of the present invention can be seen upon review of the figures, the detailed description, and the claims that follow.

DETAILED DESCRIPTION

Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness). A three-dimensional energy storage device can be one in which an anode, a cathode, and/or a separator are non-laminar in nature. For example, if electrodes protrude sufficiently from a backplane to form a non-laminar active battery component, then the surface area for such a non-laminar component may be greater than twice the geometrical footprint of its backplane. In some instances, given mutually orthogonal X,Y,Z directions, a separation between two constant-Z backplanes should be at least greater than a spacing between electrodes in an X-Y plane, divided by the square root of two.

Some examples of three-dimensional architectures that are capable of use with certain embodiments of the present invention, and that have cathodes and anodes protruding from the same backplane, are shown in FIG. 2. FIG. 2A shows a three-dimensional assembly with cathodes and anodes in the shape of pillars, FIG. 2B shows a three-dimensional assembly with cathodes and anodes in the shape of plates, FIG. 2C shows a three-dimensional assembly with cathodes and anodes in the shape of concentric circles, and FIG. 2D shows a three-dimensional assembly with cathodes and anodes in the shape of waves. Other configurations, such as honeycomb structures and spirals might also be used with certain embodiments of the present invention. In FIG. 2, cathodes 20 and anodes 21 protrude from the same backplane and are alternating in a periodic fashion. However, in other embodiments the cathodes 20 may protrude from a different backplane than anodes 21.

Described herein is the use of safety mechanisms for reducing temperature related reliability issues in three-dimensional energy storage systems and devices. Safety mechanisms according to certain embodiments of the present invention can be incorporated into a three-dimensional battery (e.g., a three-dimensional rechargeable lithium-ion battery), such that the safety mechanisms are internal to the battery. However, in conjunction with the disclosed internal safety mechanisms, an external protection mechanism (external thermal fuse, external circuit breaker) may also be used with a three-dimensional architecture. A shutdown separator may also be used for providing internal thermal protection.

Figure 1:
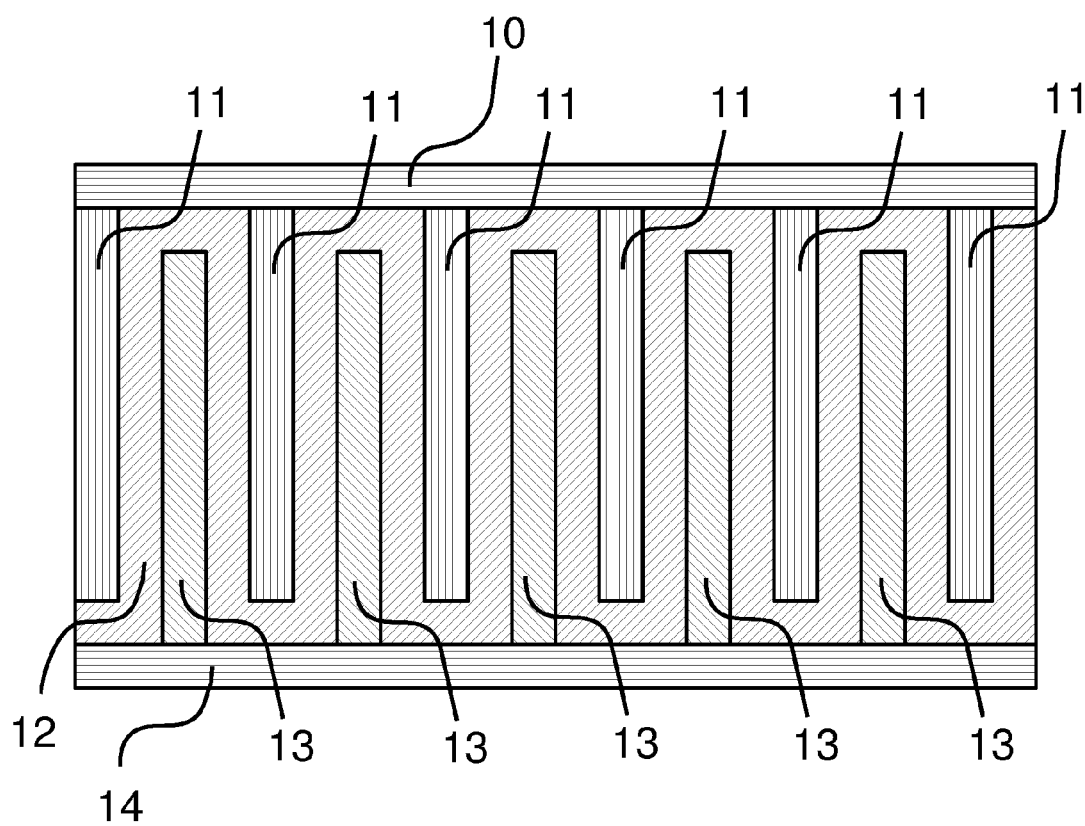
FIG. 1 is a schematic illustration of a cross section of one example of a three-dimensional lithium-ion battery that has been proposed in the literature.
Figure 2A:
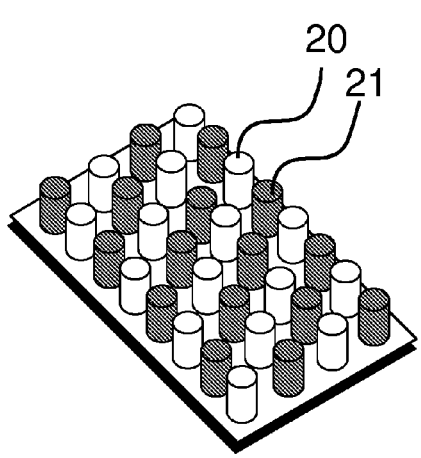
FIG. 2A-2D are schematic illustrations of some three-dimensional energy storage system architectures that may be used with an embodiment of the present invention.
Figure 2B:
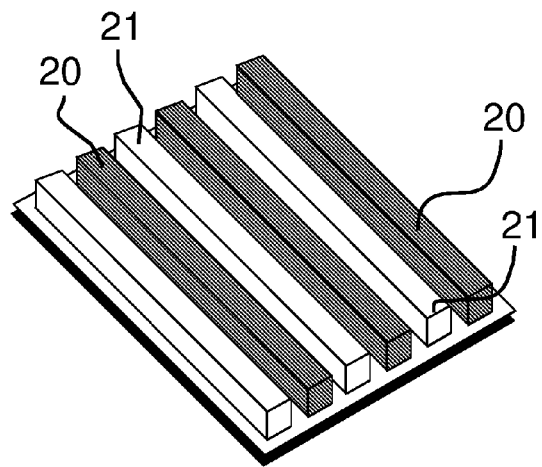
Figure 2C:
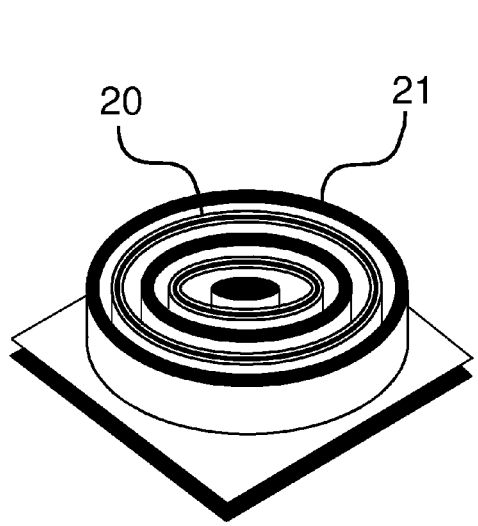
Figure 2D:
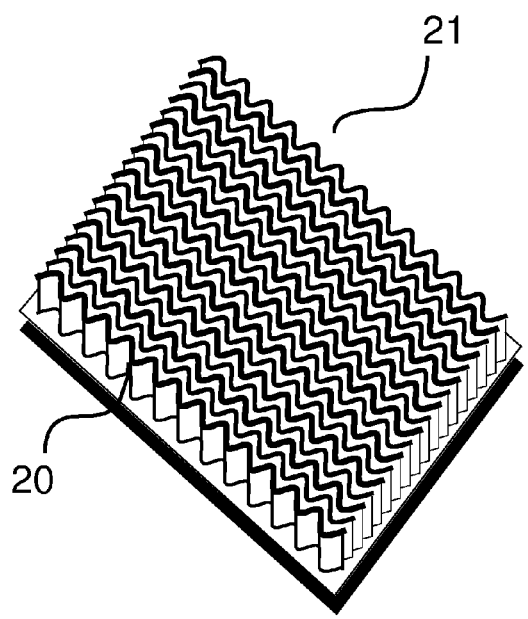
Figure 3:
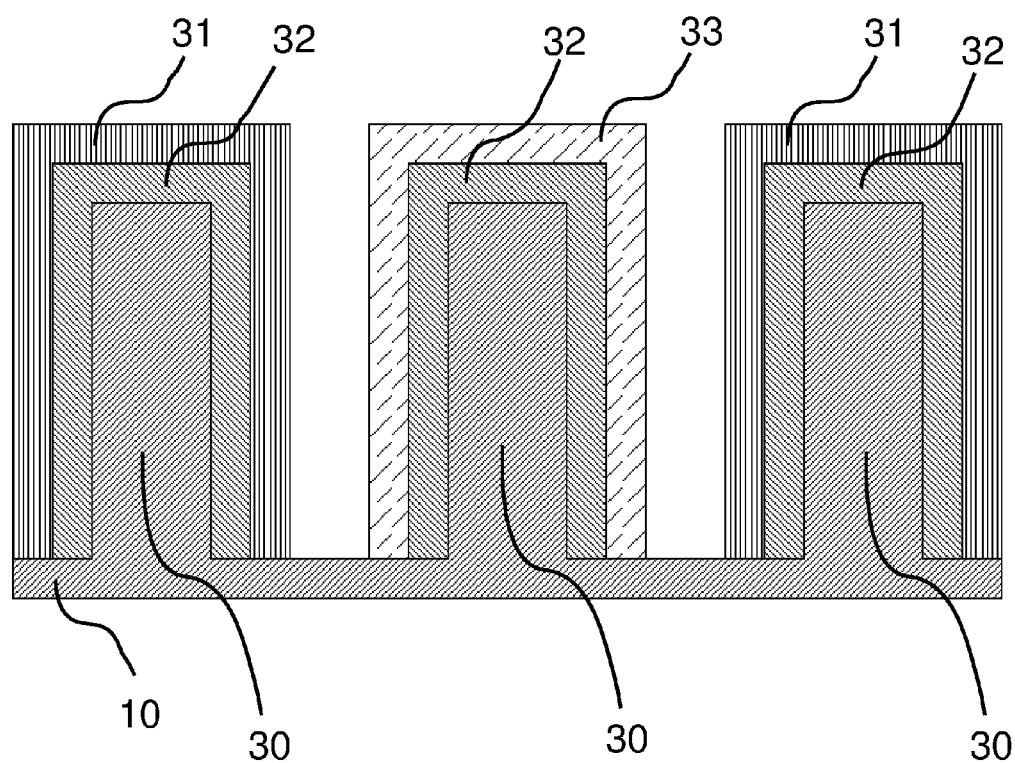
FIG. 3 is a cross-sectional schematic representation of a three-dimensional battery where a current collector also functions to dissipate heat, according to an embodiment of the invention.

The ability to reduce operating temperature by having a more thermally conductive electrode/current collector interface may be one mechanism for increasing stability. For example, a current collector and/or backbone structure for a three-dimensional battery may act as a heat sink, which in turn can reduce the probability of thermal runaway in case of a short-circuit ("short") or other high temperature event. FIG. 3 provides an example of a three-dimensional battery with components that also serve as heat sinks, among other things. In this example, the battery is constructed with a non-active backbone structure 30 on top of which an electrically conductive current collector 32 is deposited. A cathode 31 and an anode 33 are deposited using any of various methods on top of the current collector 32. The whole assembly can be submerged into a separator matrix to form the battery.

The battery of FIG. 3 has better heat sink characteristics, in part because of the availability of a higher surface area of the highly conductive current collector 32 relative to cathode or anode materials. In a two-dimensional design, a current collector may not transfer much heat since a transport of heat from an electrode/separator interface (which is where many high-temperature reactions occur) to the current collector can be significantly slower due to large transport distances through a mildly conducting active material porous matrix. By contrast, in certain three-dimensional arrays, transport distances are smaller, and a surface area of a current collector that is in contact with an electrode material can be significantly greater, thereby increasing heat transport. Heat dissipation can also be enhanced by the backbone structure 30 itself. For example, a thermal conductivity of the backbone structure 30 can be tailored to provide enhanced heat dissipation, while maintaining other desired properties for the backbone structure 30.

However, it would be preferable to design the electrode and current collector architecture to optimize other performance metrics, such as energy density, rather than to constrain the design of the electrode and current collector architecture based on their performance as a heat sink. Accordingly, three-dimensional designs that incorporate PTC materials in an integrated manner, including up to an individual electrode or sub-electrode level, are disclosed herein. Integrating the PTC material at the individual electrode level can increase sensitivity and provide more reliable isolation in the event of a short. Also, the use of such materials can lead to adequate safety even where the electrodes and current collectors do not function well as heat sinks.

Conducting polymer PTC materials typically comprise a polymer having electrically conductive particles. Under normal operating conditions many of the electrically conductive particles are in contact with each other so that the PTC material has a relatively low electrical resistance. However, when the temperature rises above a glass transition temperature of the PTC materials, for example if too high a current passes through the PTC material, then thermal expansion of the PTC material causes the conducting particles to separate and causes the electrical circuit to substantially open. In this state, the PTC material presents a higher electrical resistance to the current flow and thereby reduces the electrical current to a lower and safer level. Examples of such PTC materials include high density polyethylene loaded with graphite particles, titanate ceramic materials such as barium titanate, and so forth.

In certain embodiments of the present invention, PTC materials are integrated at a more fundamental level in a three-dimensional battery architecture, in order to provide enhanced safety. One such example is the architecture shown in FIG. 4. This architecture includes a battery enclosure 4 and a plurality of parallel plate electrodes (cathodes 42 and anodes 43) within the battery enclosure 4. The cathodes 42 preferably but not necessarily include lithium ion insertion electrodes comprising $LiCoO_2$, $Li(Ni_xCo_yAl_z)O_2$, $LiFePO_4$, $Li_2MnO_4$, or the like. The anodes 43 preferably comprise a material such as graphite, a titanate, silicon, aluminum, and/or tin. The cathodes 42 and anodes 43 are preferably assembled with a separator 44 between them. Each of a second plurality of electrodes (e.g., cathodes 42), selected from the first plurality of electrodes, protrudes from a first structural layer (e.g., current collector layer 40 or a layer underlying current collector layer 40) through a current-reducing device (e.g., an adjacent region of PTC material 41). Preferably, but not necessarily, the parallel plate electrodes comprise fins that protrude from the first structural layer at least 50 microns. Also within the battery enclosure 4, a third plurality of electrodes (e.g., anodes 43), selected from the first plurality of electrodes, protrudes from a second structural layer (e.g., current collector layer 46 or a layer underlying current collector layer 46) through current-reducing devices (e.g., adjacent regions of PTC material 45). The PTC material 41 provides a local fuse for each of the cathodes 42 and the PTC material 45 provides a local fuse for each of the anodes 43. In the event of a short involving one of the cathodes 42, a local isolation of that particular cathode 42 can take place due to a local expansion of the PTC material 41. Likewise, in the event of a short involving one of the anodes 43, a local isolation of that particular anode 43 can take place due to a local expansion of the PTC material 45. In addition to providing the ability to cut off individual sub-units in the battery, this architecture also increases the reliability of a shut-off process in the battery. This is due to an increase in the ability to detect heat in these sub-units.

Figure 4:
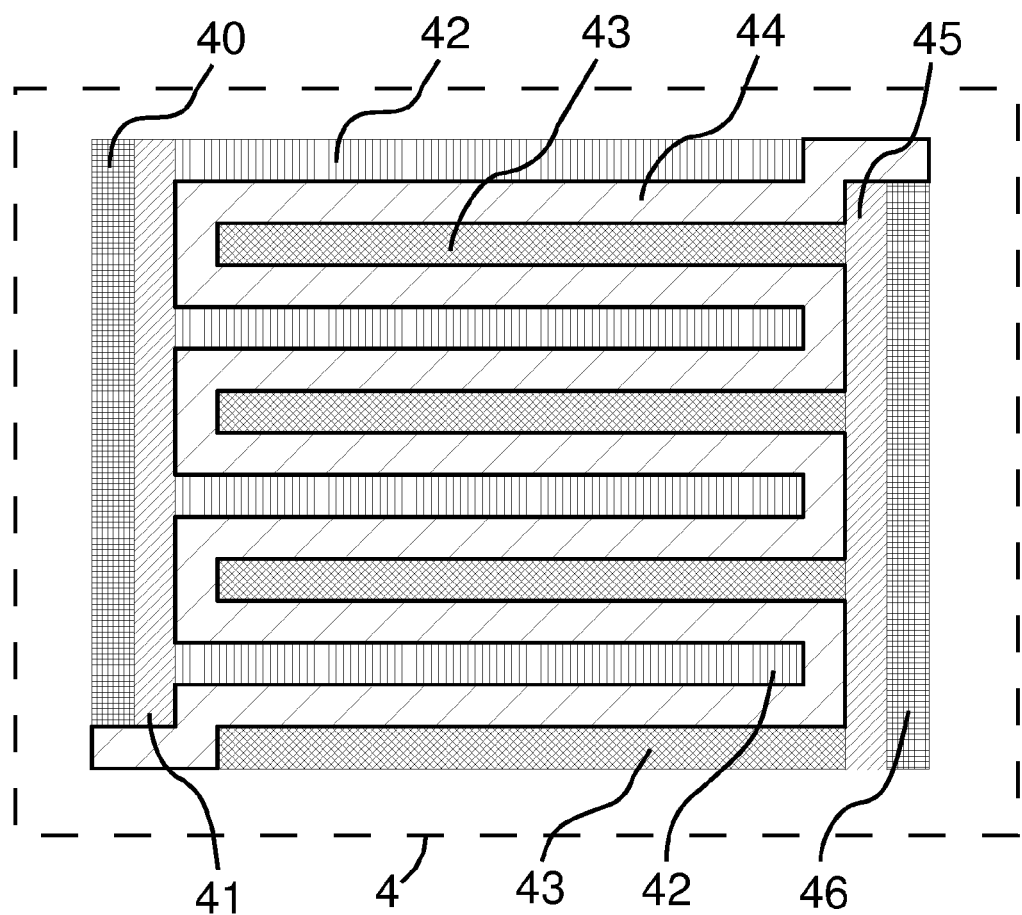
FIG. 4 is a schematic representation of the use of a PTC material integrated into an interdigitated fin design for a three-dimensional battery, according to an embodiment of the invention.

A characteristic of some three-dimensional batteries is that there are sub-unit micro-cells that contribute current to an overall larger cell. For example, if each sub-unit micro-cell in FIG. 4 is 100 microns, and the overall cell is 1 cm wide, there will be 100 cathodes and 100 anodes in the overall cell. Each cathode will, in normal operation, have 1/100 of a total current passing through it. However, in the case of an electrical short, a current increases to an amount much higher than the normal current. This rapid increase in current will trigger a corresponding local increase in heat and ensure that the PTC material 41 is reliably triggered. This integration of a self-regulating fuse into a three-dimensional battery provides an advantageous safety feature, namely the ability to respond to shorts within an overall cell. This intra-cell shorting response feature is accomplished in certain embodiments due to the three-dimensional architecture and integrated PTC materials, wherein a current is split into multiple micro-cells within the overall cell. Each of these micro-cells can be independently monitored and regulated to provide increased level of safety.

Figure 5:
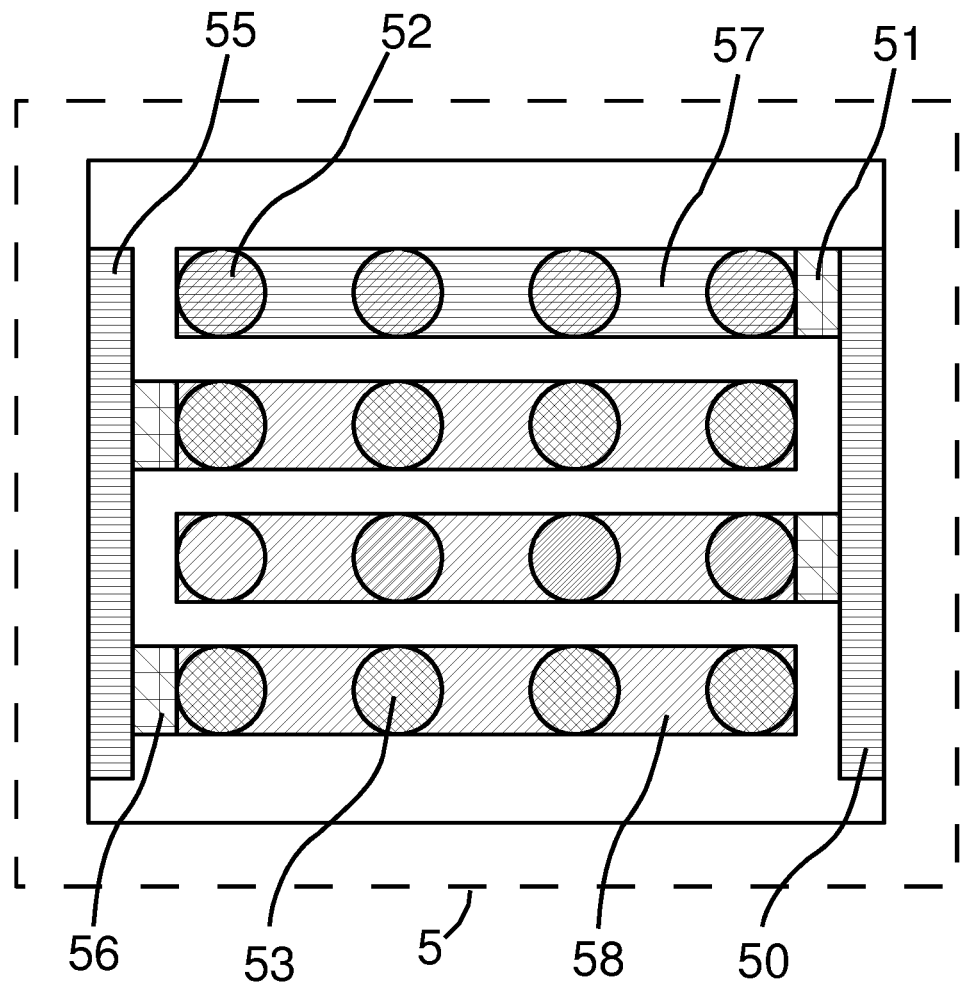
FIG. 5 is a schematic representation of the use of a PTC material integrated into an interdigitated pillar design for a three-dimensional battery with a top-side electrical connection, according to an embodiment of the invention.

FIG. 5 shows another example of an integration scheme for a PTC material 51, 56 on a three-dimensional architecture that includes a first plurality of electrodes within a battery enclosure 5, the first plurality of electrodes comprising an interdigitated array of pillars 52, 53. Each of a second plurality of electrodes (e.g., pillar-shaped cathodes 52), selected from the first plurality of electrodes, protrudes from a first structural layer 57. Also within the battery enclosure 5, a third plurality of electrodes (e.g., pillar-shaped anodes 53), selected from the first plurality of electrodes, protrudes from a second structural layer 58. Structural layers 57 and 58 may be electrically conductive or include an electrically conductive coating.

In the embodiment of FIG. 5, current collector 50 provides an electrical path to cathodes 52 via PTC material 51. This approach provides flexibility to incorporate the PTC material 51 in a variable fashion. For example, the PTC material 51 can be added at any place along the current collector 50. A design may specify or optimize a specific number of cathodes 52 that are connected without being separated by the PTC material 51. Likewise, current collector 55 provides an electrical path to anodes 53 via PTC material 56. The PTC material 56 can be added at any place along the current collector 55. A design may specify or optimize a specific number of anodes 53 that are connected without being separated by the PTC material 56.

That is, the PTC material 51 provides a local fuse for groups of cathodes 52 and the PTC material 56 provides a local fuse for groups of anodes 53. In the event of a short involving one of the cathodes 52, a local isolation of its associated group of cathodes 52 can take place due to a local expansion of the PTC material 51. Likewise, in the event of a short involving one of the anodes 53, a local isolation of its associated group of anodes 53 can take place due to a local expansion of the PTC material 56. This provides the ability to cut off particular sub-groups of electrodes within the battery enclosure 5, and thereby increases the reliability of a shut-off process in the battery.

Figure 6:
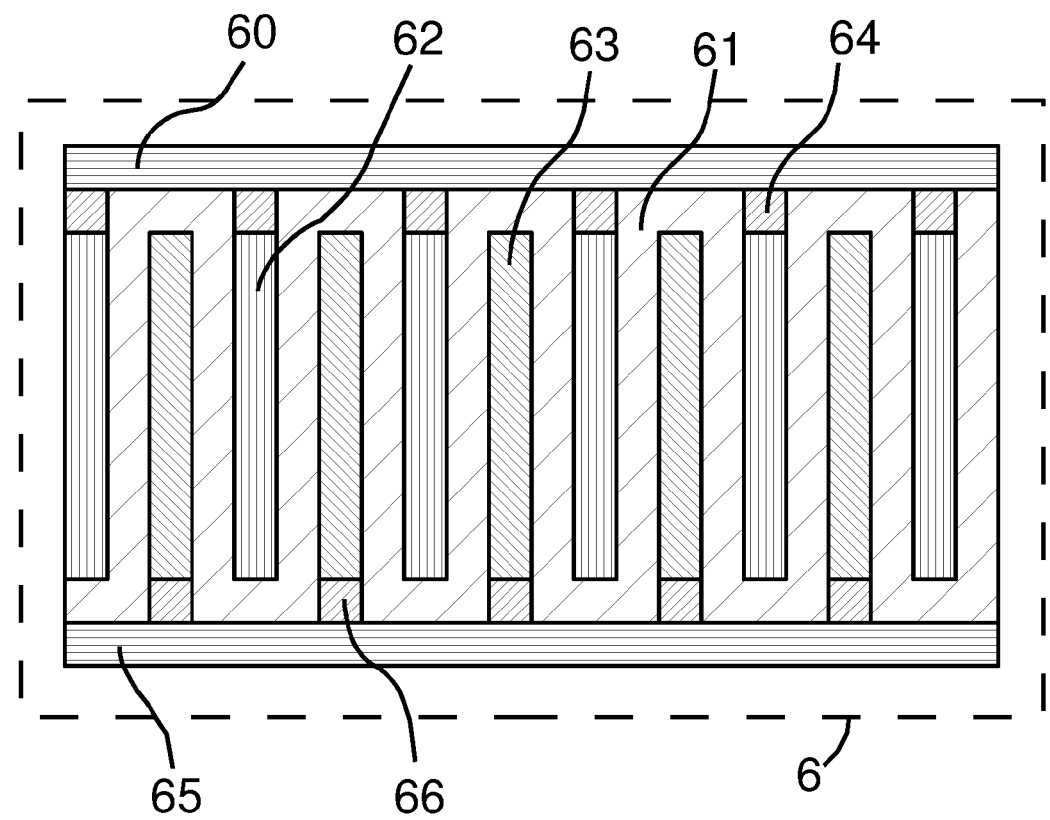
FIG. 6 is a schematic representation of the use of a PTC material integrated into a three-dimensional battery in an individual electrode unit level, according to an embodiment of the invention.

FIG. 6 addresses another approach to use a PTC material 64 in a three-dimensional battery. This approach allows isolation of each cathode 61 and anode 62 in the event of a temperature increase. In this approach, the PTC material 64 is integrated into every cathode 61 and anode 62 before it is connected to a current collector 60. In this case, a separator 63 inhibits the PTC material 64 from shorting.

The embodiment of FIG. 6 includes a battery enclosure 6 and a first plurality of electrodes (cathodes 62 and anodes 63) within the battery enclosure 6. The cathodes 62 and anodes 63 preferably but not necessarily include lithium ion insertion electrodes comprising $LiCoO_2$ or the like, and are assembled with a separator 61 in between. Each of a second plurality of electrodes (e.g., anodes 63), selected from the first plurality of electrodes, protrudes from a first structural layer (e.g., current collector layer 65 or a layer underlying current collector layer 65) through a current-reducing device (e.g., PTC material 66). Also within the battery enclosure 6, a third plurality of electrodes (e.g., cathodes 62), selected from the first plurality of electrodes, protrudes from a second structural layer (e.g., current collector layer 60 or a layer underlying current collector layer 60) through current-reducing devices (e.g., PTC material 64). The PTC material 64 provides a local fuse for each of the cathodes 62 and the PTC material 66 provides a local fuse for each of the anodes 63. In the event of a short involving one of the cathodes 62, a local isolation of that particular cathode 62 can take place due to a local expansion of the PTC material 64. Likewise, in the event of a short involving one of the anodes 63, a local isolation of that particular anode 63 can take place due to a local expansion of the PTC material 66.

Traditional PTC materials can be reversible in nature, which means that an isolated electrode may be electrically reconnected once an event that changed the state of the PTC material has passed. This provides the advantage of maintaining the capacity of an energy storage device. A similar result may be obtained by replacing the PTC material with solid-state switches that are responsive to a detector of current or temperature. However, in certain embodiments of the present invention, the PTC materials can be replaced with fuse-like materials that provide permanent open circuits in the event of a short, thereby isolating that particular electrode permanently. Such a permanent mechanism may be preferable in certain three-dimensional batteries, for example where each micro-cell accounts for very small values in terms of total current and capacity. Such a battery can continue to operate at a high level of efficiency even when a few micro-cells are permanently isolated in response to shorting.

While the invention has been described with reference to the specific exemplary embodiments thereof, it should be understood by those skilled in the art that various changes may be made and equivalents may be substituted without departing from the true spirit and scope of the invention as defined by the appended claims. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A three-dimensional battery comprising
a battery enclosure,
an anode current collector,
a plurality of anodes extending from a first layer and electrically connected, in parallel, to the anode current collector by parallel electrically conductive anode pathways,
a cathode current collector,
a plurality of cathodes extending from a second layer and electrically connected, in parallel, to the cathode current collector by parallel electrically conductive cathode pathways, and
a plurality of electrical current-reducing devices
wherein
the anode current collector, the plurality of anodes, the cathode current collector, the plurality of cathodes, the electrically conductive cathode pathways, the first and second layers, and the plurality of electrical current-reducing devices are within the battery enclosure,
the plurality of anodes and the plurality of cathodes are interdigitated and in direct contact with a common electrolyte for ion exchange between the anodes and the cathodes during operation of the battery,
each member of the plurality of anodes has a surface area, ignoring porosity and surface roughness, that exceeds its geometrical footprint in the first layer by a factor of at least 2,
each member of the plurality of cathodes has a surface area, ignoring porosity and surface roughness, that exceeds its geometrical footprint in the second layer by a factor of at least 2, and
the plurality of electrical current-reducing devices (i) are located in different parallel electrically conductive anode pathways electrically connecting different anodes selected from the plurality of anodes to the anode current collector and have the capacity to locally electrically isolate the different anodes from each other in response to an electrical short involving one or more of the anodes or (ii) are located in different parallel electrically conductive cathode pathways electrically connecting different cathodes selected from the plurality of cathodes to the cathode current collector and have the capacity to electrically isolate the different cathodes from each other in response to an electrical short involving one of the cathodes.

2. The three-dimensional battery of claim 1 wherein each of the plurality of electrical current-reducing devices comprises a PTC layer including positive-temperature-coefficient (PTC) material.

3. The three-dimensional battery of claim 2 wherein the PTC material is a conductive-polymer PTC material.

4. The three-dimensional battery of claim 3 wherein the PTC material comprises polyethylene including graphite particles.

5. The three-dimensional battery of claim 2 wherein the PTC material comprises barium titanate.

6. The three-dimensional battery of claim 1 wherein the plurality of electrical current-reducing devices collectively enable (i) each member of the plurality of anodes to be locally electrically isolated from each of the other members of the plurality of anodes or (ii) each member of the plurality of cathodes to be locally electrically isolated from each of the other members of the plurality of cathodes.

7. The three-dimensional battery of claim 6 wherein the PTC material is a conductive-polymer PTC material.

8. The three-dimensional battery of claim 7 wherein the PTC material comprises polyethylene including graphite particles.

9. The three-dimensional battery of claim 6 wherein the PTC material comprises barium titanate.

10. The three-dimensional battery of claim 1 wherein the plurality of current-reducing devices comprises a plurality of solid state switches.

11. The three-dimensional battery of claim 1 wherein the plurality of current-reducing devices comprises a plurality of fuses.

12. The three-dimensional battery of claim 1 wherein the plurality of anodes comprises lithium ion insertion electrodes.

13. The three-dimensional battery of claim 6 wherein the plurality of cathodes comprises a material selected from the group consisting of $LiCoO_2$, $Li(Ni_xCo_yAl_z)O_2$, $LiFePO_4$, and $Li_2MnO_4$.

14. The three-dimensional battery of claim 1 wherein the plurality of anodes and the plurality of cathodes comprise fins protruding at least 50 microns from the first structural layer.

15. The three-dimensional battery of claim 1 wherein the plurality of electrical current-reducing devices are located in different parallel electrically conductive anode pathways electrically connecting different subsets of the plurality of anodes to the anode current collector.

16. The three-dimensional battery of claim 1 wherein the plurality of electrical current-reducing devices are located in different parallel electrically conductive cathode pathways electrically connecting different subsets of the plurality of cathodes to the cathode current collector.

17. The three-dimensional battery of claim 1 further comprising a second structural layer within the battery enclosure, wherein the plurality of anodes or the plurality of cathodes protrude from the second structural layer.

18. The three-dimensional battery of claim 17 wherein the plurality of anodes but not the plurality of cathodes protrude-from the second structural layer.

19. The three-dimensional battery of claim 17 wherein the plurality of cathodes but not the plurality of anodes protrude-from the second structural layer.

20. The three-dimensional battery of claim 1 wherein the plurality of anodes or the plurality of cathodes comprise a protrusion that protrudes from the first structural layer and has an electrically conductive outer surface, and an electrode layer on the conductive outer surface.

21. The three-dimensional battery of claim 1 wherein the plurality of electrical current-reducing devices are located in different parallel electrically conductive anode pathways electrically connecting different subsets of the plurality of anodes to the anode current collector and each such subset comprises more than one anode.

22. The three-dimensional battery of claim 21 wherein the plurality of electrical current-reducing devices are located in different parallel electrically conductive cathode pathways electrically connecting different subsets of the plurality of cathodes to the cathode current collector and each such subset comprises more than one cathode.

23. The three-dimensional battery of claim 1 wherein the plurality of electrical current-reducing devices are located in different parallel electrically conductive cathode pathways electrically connecting different subsets of the plurality of cathodes to the cathode current collector and each such subset comprises more than one cathode.

24. The three-dimensional battery of claim 1 wherein the plurality of electrical current-reducing devices collectively enable each anode of the plurality of anodes to be locally electrically isolated from each of the other anodes comprised by the plurality of anodes.

25. The three-dimensional battery of claim 24 wherein the plurality of electrical current-reducing devices collectively enable each cathode of the plurality of cathodes to be locally electrically isolated from each of the other cathodes comprised by the plurality of cathodes.

26. The three-dimensional battery of claim 1 wherein the plurality of electrical current-reducing devices collectively enable each cathode of the plurality of cathodes to be locally electrically isolated from each of the other cathodes comprised by the plurality of cathodes.

27. The three-dimensional battery of claim 1 wherein the first and second layers are the same layer.

28. The three-dimensional battery of claim 1 wherein the first and second layers are opposing layers.

* * * * *